Figure 1:
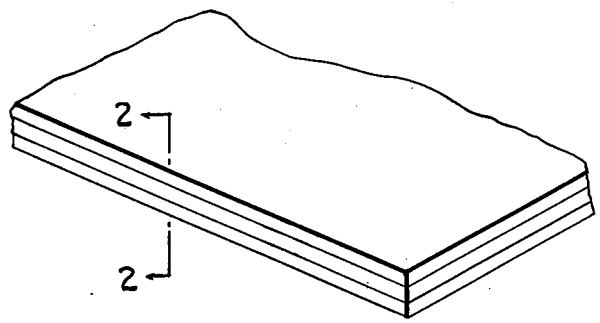

Jan. 22, 1963   M. A. KING ETAL   3,074,841
METHOD OF LAMINATING POLYVINYL RESIN SHEETS
Filed March 24, 1955

INVENTORS
MURRAY A. KING and
BROOK J. DENNISON
BY
Oscar L. Spencer
ATTORNEY

United States Patent Office 3,074,841
Patented Jan. 22, 1963

3,074,841
METHOD OF LAMINATING POLYVINYL
RESIN SHEETS
Murray A. King and Brook J. Dennison, Tarentum, Pa.,
assignors to Pittsburgh Plate Glass Company
Filed Mar. 24, 1955, Ser. No. 496,558
5 Claims. (Cl. 156—325)

This invention relates to adhesive compositions and more particularly to a composition adapted to be used for the treatment of a surface portion of synthetic organic resin or a thermoplastic, such as a polyvinyl acetal, and relates to laminated products using the treated resin and thermoplastic sheets.

This application is a continuation-in-part of our copending applications entitled "Laminating Adhesive," filed November 13, 1951, Serial No. 256,145, and "Laminating Adhesives and Laminates Made Therefrom," filed November 6, 1952, Serial No. 319,178, both now abandoned.

As pointed out in our parent application Serial No. 256,145, it is known that rigid transparent cast resinous sheets can be prepared from copolymers of polymerizable ethylenically unsaturated compounds and polyesters of polyalcohols, such as diethylene glycol or propylene glycol and ethylenically unsaturated dicarboxylic acids such as maleic acid or fumaric acid. The clear, cast sheets of these copolymers can be used as substitutes for glass in viewing closures, such as in a canopy of an airplane, due to their outstanding scratch, abrasion, craze and heat resistance. Many such materials have been disclosed in the prior art, for example, in U.S. Patents 2,409,633, 2,443,735 to 2,443,741 and 2,450,552.

In order to provide closures of greater strength and impact resistance and to avoid shattering thereof upon fracture, it is desirable that the cast resinous sheet be laminated with some suitable thermoplastic, such as plasticized polyvinyl butyral, which has been used in laminating sheets of glass to form so-called safety glass construction.

When glass and polyvinyl butyral are laminated, no adhesive is required to provide good adhesion between the glass and the plastic. The plastic and glass are pressed together under moderate heat to seal the edges and then the resulting laminate is subjected to high temperatures, viz. 190 to 325° F., and hydraulic pressures, e.g. 100 to 250 p.s.i. in an autoclave in order to bring the entire plastic interlayer into intimate contact with the glass surface. However, when rigid sheets of a synthetic resin such as described above are laminated with sheets of a non-rigid plastic interlayer, such as polyvinyl butyral, it was not possible heretofore to obtain good adhesion between the synthetic resin and the plastic. It is among the objects of the present invention to provide an improved laminate of this type and an improved method of making such a laminate, as well as a novel adhesive for making such laminates.

Figure 2:
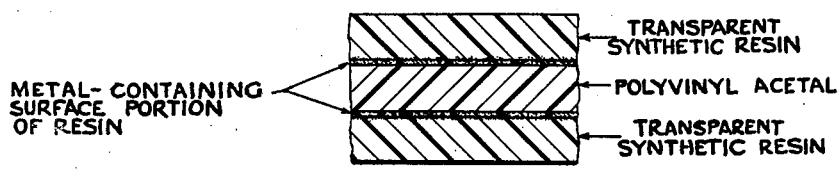

A typical laminate prepared according to the present invention is illustrated somewhat diagrammatically in the accompanying drawing wherein:

FIGURE 1 is a perspective view of a corner portion of a laminated sheet and;

FIGURE 2 is a section taken on the line 2—2 of FIGURE 1 and showing that the laminate comprises two outer layers of transparent synthetic organic resin each having a polyvalent-metal-containing surface portion and a central layer of polyvinyl acetal which is bonded to the treated surface portion of each resin layer with the polyvalent-metal-containing surface portion of the resin being prepared by treating the resin with metal salt adhesive of the present invention.

In one of its broader aspects the present invention comprises a composite or laminar structure wherein a rigid body of a synthetic resin namely, a resin having reactive groups, e.g. a resin having free hydroxyl groups, is bonded to a non-rigid plastic, such as a plasticized polyvinyl acetal, by a nonelectroconductive transparent, noncrystalline polyvalent-metal-containing surface portion of the resin. The synthetic resin having such a surface portion is obtained in the present invention by using an adhesive, the essential active ingredient of which is a polyvalent metal salt. The adhesive composition used in making such a structure is prepared for application to the resin and/or plastic layers by dissolving a polyvalent metal salt in a suitable solvent, either with or without the addition of a hydrolysis-modifying agent. It has been found that the rate and/or extent of hydrolysis of the metal salt in the solvent used has an important bearing on its effectiveness as an adhesive. Thus, in the case of one group of metal salts satisfactory adhesion can be obtained without the use of any hydrolysis-modifying agent. With certain other metal salts, optimum results are obtained by incorporating in the adhesive composition a hydrolysis-modifying agent capable of retarding or diminishing the hydrolysis of the salt. With still a third group of salts, optimum results are obtained by using a hydrolysis-modifying agent that increases the hydrolysis of the metal salt. It should be noted that the foregoing three categories are not necessarily mutually exclusive since certain metal salts give satisfactory results both with and without the use of a hydrolysis-modifying agent.

While we do not wish to be bound by any particular theory as to the operativeness of the present invention, it is our present belief that the success of the metal salt adhesives described herein depends upon reaction and/or dissolution in a surface portion of the resin or plastic and this result is dependent upon the hydrolysis of the salt. Our experiments indicate that the hydrolysis of the salt should be controlled to cause it to occur at the proper time, specifically, after the adhesive has been applied to the resin surface. If the hydrolysis occurs too rapidly, or if insufficient hydrolysis occurs, unsatisfactory adhesion is obtained. Also it has not been found possible to insure satisfactory adhesions with salts of monovalent metals.

It has been found that a wide variety of polyvalent metal salts can be used in preparing adhesives suitable for use in accordance with the present invention, and satisfactory results have been obtained when using salts of the following metals: beryllium; magnesium; aluminum; calcium; titanium; vanadium; chromium; manganese; iron; cobalt; nickel; copper; zinc; germanium; strontium; zirconium; molybdenum; ruthenium; palladium; cadmium; indium; tin; antimony; barium; lanthanum; cerium; neodymium; hafnium; tungsten; mercury; thallium; lead; bismuth; thorium; and uranium. It has been found that in general, the acetates including substituted acetates such as chloroacetates and hydroxyacetates, and halides, viz., chlorides, bromides, fluorides and iodides, of the polyvalent metals give preferred results. Within this group especially satisfactory results have been obtained with the following salts: beryllium chloride, magnesium chloride, magnesium acetate, calcium acetate, titanium tetrachloride, divanadium tetrachloride, chromic chloride, manganese acetate, ferric chloride, ferrous chloride, ferric acetate, cobalt acetate, nickel acetate, cupric acetate, zinc acetate, germanium tetrachloride, zirconium tetrachloride, zirconium acetate, ruthenium trichloride, cadmium acetate, stannous chloride, stannic chloride, stannous acetate, stannous bromide, stannous iodide, stannous fluoride, barium acetate, tungsten hexachloride, mercuric acetate, lead acetate, thorium acetate, thorium chloride and uranium acetate.

As indicated above the metal salt to be used is dissolved in a suitable solvent, that is, a solvent which will dissolve the salt and satisfactorily wet the surface of the resinous sheet or plastic interlayer. In many cases water has been found to be a satisfactory solvent, especially when used in conjunction with a non-ionic or anionic wetting or surface active agent, such as a sodium salt of an alkylated aryl polyether sulfate or a polyoxyethylene ester of mixed fatty acids. Lower aliphatic alcohols containing up to 10 carbon atoms are also satisfactory for use as solvents. Ketones, esters, hydrocarbons and chlorinated hydrocarbons containing up to 10 carbon atoms and mixtures of these organic solvents have also been found satisfactory. Among the foregoing solvents n-butyl alcohol has been found to be especially useful.

The concentration of the metal salt in the solvent may be varied considerably. In the case of most of the salts tested a 1% by weight solution of the salt in the solvent was found to be a convenient concentration. Concentrations of 0.5 to 5% by weight appear to be satisfactory.

The adhesive composition of this invention may be applied either to the surface of the synthetic organic resin or to the surface of the plastic. The composition and the resin or the plastic to which it is applied are at a temperature below the boiling point of the solvent of the adhesive composition during the application step. It is preferred that the resin or plastic and the adhesive composition be at room temperature or slightly above room temperature, such as 100° F., during this application of the composition to the surface. In any case the temperature of both during the application is a maximum of about 325° F. After application of the composition to the surface the thus-treated resin or plastic is maintained at a temperature below about 325° F. and preferably at room temperature until the solvent has evaporated. The resin and plastic are then assembled and the assembly is subjected to a laminating process of the same type that is used for the production of glass laminates, as described above with respect to conditions of temperature and pressure. In other words, the assembly is subjected to elevated temperature, namely about 190 to 325° F. and simultaneously to a pressure of, e.g., about 100 to 250 p.s.i., preferably by use of an autoclave as is customary in the production of glass laminates.

As shown below in the illustrative tests with a tin salt, the foregoing treatment changes the surface portion of the resin or the plastic or both so that satisfactory adhesion between the resin and plastic is obtained. Of course, when the adhesive composition is applied either to the resin or the plastic and the solvent is removed by evaporation using an elevated temperature or followed by maintaining the resin or plastic at a temperature considerably above room temperature, such as about 200 to 325° F., the reaction and/or dissolution of the polyvalent metal salt with the resin or plastic occurs to form a nonelectroconductive transparent noncrystalline polyvalent-metal-containing surface portion in the resin or plastic. The thus-treated surface of the resin can be satisfactorily bonded at about 190 to 325° F. and the elevated pressure recited above to the thermoplastic material, e.g., polyvinyl acetal. Similarly the thermoplastic material after its treatment can be bonded to the resin.

As indicated above it has been found important to control the hydrolysis of the metal salt in the adhesive solution and for this purpose it is often necessary to incorporate a hydrolysis-modifying agent in the adhesive. In cases where the nature of the salt used is such that hydrolysis should be retarded, the desired inhibition of hydrolysis can be conveniently obtained by the well-known "common ion" effect. For example, it has been found that when the acetates of calcium, cobalt, zinc, barium or mercury are used, the hydrolysis of the salt should be retarded, and this retardation of hydrolysis can be conveniently effected by adding acetic acid to the adhesive.

In the case of certain other salts, optimum results are obtained by using a hydrolysis-modifying agent that increases the hydrolysis of the salt. Typical salts in this category are beryllium chloride, titanium tetrachloride, magnesium acetate, ferrous chloride, germanium tetrachloride, zirconium tetrachloride and acetate and lead acetate. The hydrolysis of such salts can be increased by incorporating in the adhesive composition an organic acid, viz., a carboxylic acid or a phenol, or a carboxylic acid anhydride. Mixtures of such acids and anhydrides can be used. Organic acids useful for this purpose include acetic (when the salt is not an acetate), chloroacetic, bromoacetic, dichloroacetic, propionic, butyric, caproic, n-heptylic, caprylic, glyolic, phenol, lactic, methoxyacetic, thioglycolic, cyanoacetic, oxalic, malonic, succinic, glutaric, adipic, pimelic, sebacic, crontonic, salicylic, trimesic, diphenic, citaconic, maleic, fumaric, itaconic, benzoic, benzilic, and phthalic acids. Suitable organic anhydrides include maleic, benzoic, naphthalic and phthalic anhydrides. In the foregoing groups salicylic and crotonic acids and maleic and benzoic anhydrides are preferred. Up to 75 parts by weight of organic acid or anhydride to 1 part by weight of the polyvalent metal salt can be used, although ordinarily 1 to 5 parts per part of metal salt are sufficient to give the desired hydrolysis-promoting effect.

As indicated above, certain salts may be used either with or without the hydrolysis-modifying agent to produce adhesives giving good adhesion. For example, such salts as magnesium chloride, chromic chloride, ferric chloride and the tin acetates, namely, stannous acetate and substituted acetate, and chlorides can be used satisfactorily either without a modifying agent or with an agent that increases the hydrolysis of the salt. In like manner salts such as the acetates of cobalt, nickel, copper and zinc can be used satisfactorily either without a modifying agent or with a modifying agent such as acetic acid that represses the hydrolysis of the salt.

The quantity of the salt to be applied to the resin surface to secure optimum adhesion varies somewhat with the nature of the salt used, although this variation has been found to be rather less than might be expected. For most salts satisfactory results can be obtained using 0.01 gram to 0.2 gram of metal salt per square foot of synthetic organic resin surface. In particular cases more or less than this quantity of metal salt can be used with advantage. For example, in the case of divanadium tetrachloride satisfactory results are obtained when using 0.0075 gram of salt per square foot. For most of the salts investigated optimum adhesion was obtained when using between 0.03 and 0.05 gram of metal salt per square foot.

As indicated above, one important application of the present invention is in the production of viewing closures, such as the canopy of an airplane, consisting of a pair of transparent sheets of resin bonded to a plastic interlayer which is preferably polyvinyl butyral. The adhesive compositions described above are useful for bonding a plastic interlayer made of, for example, polyvinyl butyral to a variety of different types of resinous sheets. The preferred synthetic organic resin is a copolymer of an ethylenically unsaturated polymerizable compound with a polyester of a polyhydric alcohol and a dicarboxylic acid or mixture of such acids, at least a part of which mixture is an alpha-beta ethylenic, alpha-beta dicarboxylic acid. The polyesters are copolymerized with ethylenically unsaturated polymerizable compounds such as styrene, divinylbenzene, n-ethyl maleimide, vinyl acetate, methyl methacrylate, methyl acrylate, allyl acetate, diallyl phthalate, diallyl succinate, diallyl adipate, diallyl sebacate, diethylene glycol bis (allyl carbonate) and vinyl chloride.

Suitable dicarboxylic acids which are used in the formation of the polyester are maleic, fumaric, aconitic, mesaconic, citraconic, ethylmaleic, pyrocinchonic, zeronic, and itaconic and their halo-substituted derivatives, e.g., chloromaleic, etc.

The anhydrides of these acids, where the anhydrides exist, are of course, embraced under the term "acid," since the reaction products or polyesters are the same. Often it is preferable to prepare the polyester using the anhydride rather than the free acid.

Dihydric alcohols which are employed in forming the polyester contain up to 10 carbon atoms and include ethylene glycol, diethylene glycol, triethylene glycol, polyethylene glycol, 1,3-propylene glycol, 1,2-propylene glycol, dipropylene (1,3 or 1,2) glycol, butylene glycol, and halo-substituted glycols, e. g., mono-chloro derivatives of the above listed glycols.

It is to be understood that non-ethylenic dicarboxylic acid components are present along with the ethylenically unsaturated dicarboxylic acid in the polyester. Up to 10 to 12 mols of the non-ethylenic dicarboxylic acid per mol of the ethylenically unsaturated dicarboxylic acid may be used. These non-ethylenic acids include phthalic acid, tetrachlorophthalic acid, succinic acid, adipic acid, suberic acid, azelaic acid, sebacic acid, dimethyl succinic acid, their halogenated derivatives and mixtures thereof. For purpose of the present invention, the aromatic neuclei of such acids as phthalic are regarded as saturated since the double bonds do not react by addition as do ethylenic groups.

Other clear cast resinous sheets which are provided with good adhesion to a plastic interlayer, upon lamination by use of the adhesive composition in accordance with this invention, are those synthetic resins formed by reaction of a phenol with an aldehyde, such as formaldehyde or furfural.

Various unsaturated alcohol esters polymerize to form clear cast resinous sheets which may be laminated with polyvinyl butyral in accordance with this invention. Thus, polymers of esters wherein the acid groups are separated by ester, ether or nitrogen linkages, such as diethylene glycol bis (allyl carbonate), are provided with good adherence to polyvinyl butyral by use of the novel adhesive composition herein disclosed. Such esters include esters of (a) a polyhydric alcohol, such as ethylene glycol, diethylene glycol, propylene glycol, glycerol, resorcinol, phthallyl alcohol, etc., and (b) allyl acid carbonate or an allyl acid ester of a saturated dicarboxylic acid such as phthalic, succinic acid, etc., wherein two or more of the hydroxy groups of the polyhydric alcohol are esterified with the acid.

These esters also include carbamate esters, such as may be prepared by reaction of allyl carbamate with an aldehyde, such as formaldehyde or acetaldehyde, esters prepared by reaction of allyl chloroformate with allyl esters of hydroxy acids, such as allyl lactate, allyl glycolate, allyl alpha-hydroxybutyrate, allyl salicylate, etc., and other unsaturated alcohol polyesters such as are described in U. S. Patents Nos. 2,387,933, 2,385,932 and 2,401,549.

Other synthetic resins formed by polymerization of polymerizable ethylenically unsaturated compounds which contain a negative group attached to an ethylenic group and which are free from conjugation with respect to carbon may be laminated with polyvinyl butyral in accordance with this invention. Such compounds contain the non-aromatic polymerizable group $$-\overset{|}{C}=\overset{|}{C}-$$

linked to a negative group which activates the polymerizing character of the ethylenic group such as:

$$-Cl, -\underset{\underset{O}{\|}}{C}-O-, \ -\underset{\underset{O}{\|}}{C}-NH_2, -O-\underset{\underset{O}{\|}}{C}-O-,$$

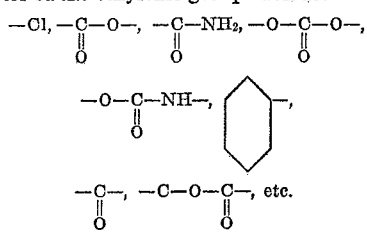

Compounds which contain one or more vinyl groups,

are intended as materials which are polymerized to form the synthetic organic resin. Monofunctional compounds which contain but a single polymerizable ethylenic group include acrylamide, maleimides such as N-ethyl maleimide, vinyl chloride, vinylidene chloride, acrylic acid, methacrylic acid, alpha chloro-acrylic acid and esters of such acids, particularly the methyl and ethyl esters, such as methyl acrylate, etc., methyl alpha chloro-acrylate, or the corresponding ethyl, propyl or similar esters, styrene, alpha-methylstyrene, alpha-methyl, para-methylstyrene or other polymerizable chloro-, ethyl- or methyl-substituted styrenes or like aralkene, vinyl acetate, itaconic imide, acrylonitrile, vinyl methyl ketone, vinyl methyl or butyl ether, allyl acetate, allyl carbamate, etc. Of particular interest are the monohydric esters of an unsaturated monohydric alcohol or unsaturated monocarboxylic acid containing a vinyl group in which one carbon atom of the vinyl group is the second carbon atom from an ester linkage, including esters of vinyl alcohol, allyl alcohol, methallyl alcohol, 2-chloroallyl alcohol, and equivalent alcohols and/or of acrylic and methacrylic and like monocarboxylic acids, each containing up to about 5 carbon atoms. By "ester linkage" is meant the group

having an oxygen atom adjacent to a carbonyl group.

Polyfunctional compounds containing two or more of such

groups are contemplated and include divinyl benzene, trivinyl benzene, polyesters of the above mentioned unsaturated monohydric alcohols and dicarboxylic and polycarboxylic acids including diallyl maleate, diallyl fumarate, diallyl sebacate, diallyl itaconate, diallyl pimelate or the corresponding methallyl, vinyl or like unsaturated alcohol esters, or esters of the above mentioned unsaturated monohydric alcohols with the above named monocarboxylic acids, such as allyl acrylate, allyl methacrylate, or vinyl acrylate or the polyhydric alcohol polyesters of such acids, such as ethylene glycol dimethacrylate, ethylene glycol diacrylate, etc. Moreover, copolymers of the corresponding ethers of the above unsaturated alcohols, such as dimethallyl ether, diallyl ether, and divinyl ether may be prepared.

The following examples are illustrative:

*Example I*

A laminate consisting of two sheets of a synthetic resin separated by a plastic interlayer of polyvinyl butyral was prepared.

The resinous sheets were copolymers which were prepared by copolymerizing 3,098 parts by weight of styrene and 186 parts by weight of methyl methacrylate with 6,685 parts by weight of mixed unsaturated polyesters of maleic, phthalic and adipic acids, and propylene and diethylene glycol. The mixed unsaturated polyesters used in the manufacture of the copolymers were a mixture of the following polyesters: 2,730 parts by weight of a polyester produced from the following compounds in the proportion indicated: 1 mol of maleic acid; 1.1 mols of propylene glycol; 3,345 parts by weight of a polyester produced from the following compounds in the proportion indicated: 3.2 mols of maleic acid; 4.8 mols of phthalic acid; 6.12 mols of propylene glycol; and 2.04 mols of diethylene glycol; and 610 parts by weight of a polyester produced from the following compounds in the proportions indicated: 1 mol of maleic acid; 6 mols adipic acid; and 7.18 mols of diethylene glycol.

An adhesive composition, consisting of one part by weight of stannous chloride, 5 parts by weight of benzoic anhydride, and 94 parts by weight of n-butanol, at room temperature was sprayed on one side of each resinous sheet also at room temperature in an amount of about 3 cubic centimeters per square foot of the synthetic resin. The sprayed sheets were allowed to dry thoroughly at room conditions.

The sheets of synthetic resin were then assembled with the plastic interlayer preparatory for lamination, with the coated side of each sheet being placed in contact with the plastic interlayer. This assembly was then placed between two glass sheets and the entire assembly was placed in a rubber bag. The rubber bag was evacuated. The evacuated rubber bag containing the assembly was placed in an autoclave for lamination according to conventional procedure for glass lamination. The lamination procedure comprised placing the rubber bag containing the assembly in a vessel containing oil at 150° F. and then applying a pressure of 200 p.s.i. to the oil. While continuing application of 200 p.s.i. pressure the oil was heated to 275° F. and then held at that temperature for thirty minutes. After this period of time the temperature was lowered to 150° F. and then the pressure was removed. The rubber bag was then removed from the autoclave and the assembly taken from the rubber bag. The glass sheets were removed from the laminated assembly. An examination of the laminated assembly indicated that there was complete adhesion throughout the area of the assembly.

The laminate was placed on a drum and the latter was then rotated at one revolution per minute in a simulated weather chamber and exposed to a cycle consisting of 17 minute sunlight and 3 minutes simulated rain.

The chamber was kept at a temperature of 120° F. during the test. The spectral range of the carbon arc providing the light extended from 279 millimicrons to 12,000 millimicrons. No visible loss of adhesion in the laminate occurred after the laminate had been exposed to these conditions for 4 weeks.

*Example II*

A satisfactory laminate consisting of two sheets of cast phenolic resin separated by a plastic interlayer of polyvinyl butyral was prepared as in Example I, using an adhesive composition consisting of 1 part by weight of stannous chloride, 5 parts by weight of benzoic anhydride and 94 parts by weight of n-butanol.

*Example III*

A laminate consisting of two sheets of a polymer of methyl alpha chloroacrylate separated by a plastic interlayer of polyvinyl butyral was satisfactorily prepared as in Example I by using 10 cubic centimeters per square foot of polymer of an adhesive composition consisting of 2.5 parts by weight of stannous chloride and 97.5 parts by weight of n-butanol.

*Example IV*

Satisfactory laminates consisting of sheets of a polymer of diethylene glycol bis (allyl carbonate) separated by a plastic interlayer of polyvinyl butyral were prepared as in Example I by using the following adhesive solutions:

(1)

| | Parts by weight |
|---|---|
| Stannous chloride | 1 |
| Maleic anhydride | 2 |
| Isopropanol | 97 |

(2)

| | |
|---|---|
| Stannic chloride tetrahydrate | 4 |
| Maleic anhydride | 2 |
| Isopropanol | 94 |

*Example V*

The following adhesive compositions were employed in preparing satisfactory laminates as described in Example I:

(1)

| | Parts by weight |
|---|---|
| Stannous chloride | 1 |
| Maleic anhydride | 3 |
| Sodium salt of an alkylated aryl polyether sulfate | 0.3 |
| Water | 95.7 |

(2)

| | |
|---|---|
| Stannous chloride | 1 |
| Benzoic anhydride | 5 |
| Isopropyl alcohol | 94 |

(3)

| | |
|---|---|
| Stannous chloride | 1 |
| Benzoic anhydride | 5 |
| Butyl acetate | 94 |

(4)

| | |
|---|---|
| Stannous chloride | 1 |
| Adipic acid | 5 |
| N-butyl alcohol | 94 |

(5)

| | |
|---|---|
| Stannous chloride | 1 |
| Benzoic anhydride | 5 |
| Cyclohexanone | 94 |

(6)

| | |
|---|---|
| Stannous chloride | 1 |
| Diphenic acid | 5 |
| n-Butanol | 94 |

(7)

| | |
|---|---|
| Stannous chloride | 0.5 |
| Benzoic anhydride | 37.5 |
| n-Butanol | 62 |

(8)

| | |
|---|---|
| Stannous chloride | 1 |
| Phenol | 5 |
| n-Butanol | 94 |

(9)

| | |
|---|---|
| Stannous chloride | 1 |
| Benzoic anhydride | 5 |
| Methanol | 25 |
| Ethylene dichloride | 69 |

(10)

| | |
|---|---|
| Stannous chloride | 1 |
| Salicylic acid | 2 |
| n-Butanol | 97 |

(11)

| | |
|---|---|
| Stannic chloride | 10 |
| Benzoic anhydride | 2 |
| n-Butanol | 88 |

(12)

| | |
|---|---|
| Stannous acetate | 1 |
| Benzoic anhydride | 2 |
| n-Butanol | 97 |

(13)

| | |
|---|---|
| Stannous bromide | 1 |
| Salicylic acid | 3 |
| n-Butanol | 96 |

(14)

| | Parts by weight |
|---|---|
| Stannous chloride | 0.5 |
| Wetting agent | 0.3 |
| Water | 99.2 |

(15)

| | |
|---|---|
| Stannous chloride | 0.5 |
| Salicylic acid | 3.0 |
| n-Butanol | 96.5 |

(16)

| | |
|---|---|
| Stannous chloride | 0.5 |
| Benzoic anhydride | 25 |
| n-Butanol | 74.5 |

(17)

| | |
|---|---|
| Stannous chloride | 1 |
| Benzoic anhydride | 5 |
| Methyl ethyl ketone | 94 |

*Example VI*

A laminate was made using two sheets of copolymer and a plastic interlayer of polyvinyl butyral of the type described in Example I. The adhesive solution used consisted of 1 part by weight of ferric chloride and 2 parts by weight of benzoic anhydride in 100 parts by weight of n-butanol. The adhesive composition was applied to the resin sheet by spraying, both the composition and the sheet being at room temperature. The sprayed adhesive was allowed to dry at room conditions for about 2 hours before assembly with the plastic interlayer. Thereafter the two resin sheets and plastic interlayer were pressed together as in Example I to produce the desired satisfactory laminate.

The finished lamination was cooled to 0° F. for adhesion testing. Tests were made by firing a steel drive pin (.22 caliber) through the lamination at point blank range by means of a powder-powered tool. It was found that when subjected to this test no substantial separation of the laminated layers occurred.

*Example VII*

Satisfactory laminates were made in accordance with the procedure of Example VI but using the following adhesive compositions:

(1)

| | Parts by weight |
|---|---|
| Aluminum nitrate | 1 |
| Salicylic acid | 3 |
| 50-50 mixture of acetone and butanol | 96 |

(2)

| | |
|---|---|
| Aluminum nitrate | 1 |
| Maleic anhydride | 3 |
| 50-50 mixture of methyl ethyl ketone and butanol | 96 |

(3)

| | |
|---|---|
| Barium acetate | 1 |
| Glacial acetic acid | 5 |
| Salicylic acid | 3 |
| 50-50 mixture of methanol and n-butanol | 91 |

(4)

| | |
|---|---|
| Beryllium chloride | 1 |
| Salicylic acid | 3 |
| n-Butanol | 96 |

(5)

| | |
|---|---|
| Beryllium chloride | 1 |
| Salicylic acid | 6 |
| n-Butanol | 93 |

(6)

| | Parts by weight |
|---|---|
| Beryllium chloride | 1 |
| Maleic anhydride | 2 |
| n-Butanol | 97 |

(7)

| | |
|---|---|
| Cadium acetate | 1 |
| n-Butanol | 99 |

(8)

| | |
|---|---|
| Calcium acetate | 1 |
| Water | 10 |
| Glacial acetic acid | 10 |
| Methanol | 39 |
| Salicylic acid | 3 |
| n-Butanol | 37 |

(9)

| | |
|---|---|
| Chromic chloride | 1 |
| Crotonic acid | 3 |
| n-Butanol | 96 |

(10)

| | |
|---|---|
| Cobalt acetate | 1 |
| Glacial acetic acid | 5 |
| Methanol and butanol | 94 |

(11)

Saturated solution of cupric acetate in n-butanol.

(12)

| | |
|---|---|
| Germanium tetrachloride | 1 |
| 30% hydrochloric acid | 75 |
| Wetting agent | 0.3 |
| Maleic anhydride | 3 |

(13)

| | |
|---|---|
| Indium nitrate | 1 |
| Wetting agent | 0.3 |
| Nitric acid | 3 |
| Maleic anhydride | 2 |
| Water | 93.7 |

(14)

| | |
|---|---|
| Ferrous chloride | 1 |
| Benzoic anhydride | 2 |
| n-Butanol | 97 |

(15)

| | |
|---|---|
| Ferric chloride | 1 |
| Benzoic anhydride | 2 |
| n-Butanol | 97 |

(16)

| | |
|---|---|
| Ferric acetate | 1 |
| Crotonic acid | 3 |
| n-Butanol | 96 |

(17)

| | |
|---|---|
| Lead acetate | 1 |
| Salicylic acid | 3 |
| Methanol and n-butanol | 96 |

(18)

| | |
|---|---|
| Magnesium chloride | 1 |
| n-Butanol | 99 |

(19)

| | |
|---|---|
| Manganous acetate | 1 |
| Glacial acetic acid | 5 |
| n-Butanol | 94 |

(20)

| | Parts by weight |
|---|---|
| Mercuric acetate | 1 |
| Glacial acetic acid | 10 |
| Methanol and butanol | 89 |

(21)

| | |
|---|---|
| Nickel acetate | 1 |
| Methanol and butanol | 99 |

(22)

| | |
|---|---|
| Ruthenium trichloride | 1 |
| n-Butanol | 99 |

(23)

| | |
|---|---|
| Thorium tetracetate | 1 |
| Salicylic acid | 3 |
| n-Butanol | 96 |

(24)

| | |
|---|---|
| Thorium tetrachloride | 1 |
| Salicylic acid | 3 |
| n-Butanol | 96 |

(25)

| | |
|---|---|
| Titanium tetrachloride | 1 |
| Salicylic acid | 4 |
| n-Butanol | 95 |

(26)

| | |
|---|---|
| Tungsten hexachloride | 1 |
| Salicylic acid | 3 |
| n-Butanol | 96 |

(27)

| | |
|---|---|
| Uranium acetate | 1 |
| Salicylic acid | 3 |
| n-Butanol | 96 |

(28)

| | |
|---|---|
| Vanadium chloride ($V_2Cl_4$) | 1 |
| n-Butanol | 99 |

(29)

| | |
|---|---|
| Zinc acetate | 1 |
| n-Butanol | 99 |

(30)

| | |
|---|---|
| Zirconium acetate | 1 |
| Concentrated hydrochloric acid | 3 |
| Benzoic anhydride | 5 |
| Methanol and butanol | 91 |

(31)

| | |
|---|---|
| Zirconium tetrachloride | 1 |
| Benzoic anhydride | 3 |
| n-Butanol | 96 |

Of the various adhesives disclosed in the foregoing examples, the composition of Example I has been found to give the best results. Especially good results have also been obtained with compositions 15 and 31 of Example VII.

Laminations embodying synthetic resins united to vinyl acetal plastics and to glass or themselves through an intermediate sheet of vinyl acetal by means of an adhesive composition as herein described, have met satisfactorily the high standard set by the laminated glass industry. These laminations have been subjected to high humidities, exposure to temperatures of from 0° F. to 275° F., ultra-violet, visible, and infra-red radiation and break tests, without development of delimination, edge separation, discoloration or other defects which might be attributed to the adhesive.

In the foregoing examples the hydrated form of metal salt was usually used, although anhydrous salts are suitable.

A sheet of synthetic organic resin of the same chemical composition as that used in Example I was sprayed at room temperature with a composition of 2 parts by weight of stannous chloride, $SnCl_2 \cdot 2H_2O$, and 98 parts by weight of n-butanol. After two hours of drying at room temperature it was noted that the coated sheet was translucent. It was then subjected to X-ray analysis and the X-ray diffraction pattern of the coated sheet when compared with the X-ray diffraction pattern of an uncoated sheet of the resin indicated the coating was crystalline. These and the X-ray diffraction results presented below were obtained by the standard method of X-ray analysis.

After standing at room temperature for 24 hours the coated resin sheet was still translucent and the X-ray diffraction pattern showed the coating to be crystalline but the structure of the coating was indicated to be different than that at the end of the two-hour period. The coating at the end of both periods had X-ray diffraction patterns that were not the pattern of either $SnCl_2$ or $SnCl_2 \cdot 2H_2O$.

The coated sheet after the 24-hour period of drying at room temperature was placed against an uncoated sheet of the same synthetic organic resin with the coating between the two sheets. This assembly was placed between two glass sheets and the entire assembly was placed in a rubber bag and was subjected to laminating by heat and pressure in an autoclave in the same manner as described in Example I. The assembly of the two sheets of plastic from this treatment was examined and tested. The plastic assembly was transparent and there was no longer any evidence of a discrete coating. The adhesion was so poor that the assembly could be easily pried apart with a knife blade at room temperature. It was unnecessary to run the regular adhesion test for laminated plastic assemblies to demonstrate adhesion. The sheet, which originally contained the coating that was shown after the 24-hour period to be crystalline, was examined by the X-ray method and the diffraction pattern failed to show the presence of any crystalline material. Apparently as a result of the heating to the autoclave temperature the coating reacted with and/or dissolved in the synthetic organic resin to change the surface portion of the resin to a tin-containing composition. This composition is noncrystalline as indicated by X-ray analysis as mentioned above.

Two sheets of the resin each coated with the tin chloride composition as described above were similarly dried for 24 hours at room temperature and these two coated resin sheets were then placed together with the coated surfaces therebetween. This assembly was subjected to lamination between glass plates and in a rubber bag as described above. The product showed no adhesion between the plates and, as in the foregoing experiment, the assembly was transparent and the X-ray diffraction pattern indicated each sheet to be free of crystalline material. There was no discrete coating and apparently the autoclave treatment produced dissolution and/or reaction with the synthetic organic resin.

It is apparent from the foregoing that the laminated assemblies produced in Examples I–VII had satisfactory adhesion because the surface portion of the resin is changed by the dissolution and/or reaction with the metal salt coating to a metal-containing resin to which the polyvinyl acetal will adhere. The polyvinyl acetal would not adhere to untreated synthetic organic resin. This noncrystalline tin-containing surface portion of resin is nonelectroconductive.

For comparative purposes, two sheets of glass were sprayed with the solution of 2 percent by weight of $SnCl_2 \cdot 2H_2O$ n-butanol. The coated glass sheets were dried for 24 hours at room temperature and the sheets were placed together with the coatings therebetween. This assembly was placed in a rubber bag and subjected to the autoclave treatment as described above in Example I. The assembly after the heat and pressure treatment was still translucent. The adhesion was so poor that the assembly could be easily pried apart with a knife blade at room temperature. It was unnecessary to run the regular 0° F. crush test for laminated glass assemblies to show poor adhesion. The coating on the glass was visible and easily wiped off. An X-ray diffraction test showed the coating to be crystalline. It was soluble in distilled water and this solution when treated with silver nitrate produced a dark brown precipitate indicating tin chloride was still present.

A similar experiment was carried out in which two glass sheets were coated with the tin chloride composition. After the 24-hour drying period they were assembled with a sheet of polyvinyl butyral therebetween and with the coated side of each glass abutting the thermoplastic sheet. This assembly was subjected to the autoclave procedure for laminating and the product was transparent. There was some adhesion, but in comparison with regular laminated glass assemblies, with or without electroconductive tin oxide coatings, the regular 0° F. crush test showed poor adhesion. The coating had apparently dissolved and/or reacted with the thermoplastic sheet.

Tin chloride solutions have been used to form electroconductive tin oxide ($SnO_2$) coatings by spraying. In such a process as described, for example, in U.S. Patent No. 2,583,000, granted to William O. Lytle on January 22, 1952, and U.S. Patent No. 2,570,245, granted to Albert E. Junge on October 9, 1951, the glass is sprayed by this solution while the glass is at a high temperature such as 1150° F. Two sheets of glass each containing such as electroconductive tin oxide coating were placed together with their coatings touching. This assembly was subjected to the foregoing autoclave treatment and the product was examined. It exhibited no adhesion in the regular adhesion test. The assembly was transparent and the tin oxide coating was still visible to the naked eye. The coating or film was insoluble in water. X-ray diffraction examination of a glass sheet containing the electroconductive coating showed the coating to be crystalline and identifiable as $SnO_2$. The three strongest lines of the X-ray diffraction pattern were used to identify the crystalline material in Special Technical Publication No. 48-D, entitled "Cumulative Alphabetical and Grouped Numerical Index of X-Ray Diffraction Data," published 1954 by American Society for Testing Materials, Philadelphia, Pennsylvania. Two glass sheets each containing the electroconductive tin oxide coating were assembled with a sheet of polyvinyl butyral therebetween. The tin oxide coating of each sheet abutted the thermoplastic material. This assembly was subjected to the autoclave treatment described above and the resulting laminated assembly was transparent. It had good adhesion when tested by the standard procedure for laminated glass assemblies. The tin oxide coating remained as a discrete coating that adhered to the glass and was bonded to the polyvinyl butyral. This coating was unaffected i.e., it was still identifiable as crystalline tin oxide.

While the tests including X-ray diffraction studies, described above after Example VII, used a tin salt, the description is for purposes of illustration only. Using the other polyvalent metal salts similar reaction and/or dissolution with a surface portion of the resin or plastic is obtained in accordance with the present invention to produce a nonelectroconductive transparent noncrystalline polyvalent-metal-containing surface portion.

Although the present invention has been described with particular reference to the specific details of certain embodiments thereof, it is not intended that such details shall be regarded as limitations upon the scope of the invention except insofar as included in the accompanying claims.

We claim:

1. The method of bonding a sheet of synthetic organic resin comprising a copolymer of an ethylenically unsaturated polymerizable compound and an unsaturated polyester of a polyhydric alcohol and a polybasic acid to a sheet of polyvinyl acetal which comprises applying to a surface of said sheet of synthetic organic resin a coating of a composition containing a polyvalent metal salt and a solvent at a maximum temperature of about 325° F., evaporating solvent from the composition applied to said surface at a maximum temperature of about 325° F., placing the synthetic organic resin sheet and the polyvinyl acetal sheet together with the coated surface therebetween to form an assembly, and subjecting the assembly to pressure and a temperature between about 190 and 325° F. to bond the sheets together.

2. The process of claim 1 wherein the composition applied to the surface of said synthetic organic resin sheet is composed of 0.5 to 5% by weight of the polyvalent metal salt and the remainder being the solvent, said solvent being a lower aliphatic alcohol containing up to 10 carbon atoms.

3. The method of claim 1 wherein the composition applied to the surface of the synthetic organic resin sheet is composed of 0.5 to 5% by weight of a polyvalent metal salt, 1 to 5% by weight of a material selected from the group consisting of organic carboxylic acids and carboxylic acid anhydrides and mixtures thereof, and the remainder being the solvent, said solvent being a lower aliphatic alcohol containing up to 10 carbon atoms, the anions of said salt and said material being different.

4. The method of claim 3 wherein the composition applied to the surface of the synthetic organic resin sheet is composed of approximately 1% by weight of polyvalent metal chloride, 1 to 5% by weight of benzoic anhydride, and the remainder n-butanol.

5. The method of claim 4 wherein the metal chloride is zirconium tetrachloride.

References Cited in the file of this patent

UNITED STATES PATENTS

| | | |
|---|---|---|
| 2,357,345 | Moulton | Sept. 5, 1944 |
| 2,397,231 | Barnes | Mar. 26, 1946 |
| 2,405,602 | Nugent | Aug. 13, 1946 |
| 2,417,837 | Paggi | Mar. 25, 1947 |
| 2,418,018 | Ernsberger et al. | Mar. 25, 1947 |
| 2,429,420 | McMaster | Oct. 21, 1947 |
| 2,479,501 | Marks | Aug. 16, 1949 |
| 2,534,654 | Barnes | Dec. 19, 1950 |
| 2,592,601 | Raymond et al. | Apr. 15, 1952 |
| 2,676,950 | Sparks et al. | Apr. 27, 1954 |
| 2,716,081 | Marks | Aug. 23, 1955 |

FOREIGN PATENTS

| | | |
|---|---|---|
| 6,858 | Great Britain | of 1896 |

OTHER REFERENCES

"British Plastics," February 1944, page 80.
"Handbook of Plastics," Simonds, 2nd ed. 1949, pp. 63 and 724-25.

UNITED STATES PATENT OFFICE
CERTIFICATE OF CORRECTION

Patent No. 3,074,841 January 22, 1963

Murray A. King et al.

It is hereby certified that error appears in the above numbered patent requiring correction and that the said Letters Patent should read as corrected below.

Column 4, line 12, for "glyolic" read -- glycolic --; column 9, lines 3 and 8, for "Stannous chloride", each occurrence, read -- Stannous fluoride --.

Signed and sealed this 4th day of August 1964.

(SEAL)
Attest:

ERNEST W. SWIDER
Attesting Officer

EDWARD J. BRENNER
Commissioner of Patents